United States Patent
Chen et al.

(10) Patent No.: US 12,218,742 B2
(45) Date of Patent: Feb. 4, 2025

(54) INITIAL NETWORK ENTRY TO A COMMUNICATIONS SYSTEM

(71) Applicant: Space Exploration Technologies Corp., Hawthorne, CA (US)

(72) Inventors: Chen Chen, Irvine, CA (US); Darshan Purohit, Fremont, CA (US); Yashodhan Dandekar, Cupertino, CA (US); Pavel Chikulaev, Redmond, WA (US); David Sacks, Redmond, WA (US); Peter J. Worters, San Carlos, CA (US); Phillip E. Barber, Sammamish, WA (US)

(73) Assignee: Space Exploration Technologies Corp., Hawthorne, CA (US)

( * ) Notice: Subject to any disclaimer, the term of this patent is extended or adjusted under 35 U.S.C. 154(b) by 0 days.

(21) Appl. No.: 18/230,493

(22) Filed: Aug. 4, 2023

(65) Prior Publication Data

US 2023/0396324 A1     Dec. 7, 2023

Related U.S. Application Data

(63) Continuation of application No. 17/334,546, filed on May 28, 2021, now Pat. No. 11,757,526.

(60) Provisional application No. 63/032,868, filed on Jun. 1, 2020.

(51) Int. Cl.
| | |
|---|---|
| *H04B 7/185* | (2006.01) |
| *H04W 72/21* | (2023.01) |
| *H04W 74/00* | (2009.01) |
| *H04W 74/0833* | (2024.01) |
| *H04L 1/00* | (2006.01) |
| *H04L 5/00* | (2006.01) |

(52) U.S. Cl.
CPC ........ *H04B 7/18513* (2013.01); *H04W 72/21* (2023.01); *H04W 74/004* (2013.01); *H04W 74/0833* (2013.01); *H04L 1/0003* (2013.01); *H04L 5/0007* (2013.01)

(58) Field of Classification Search
CPC .............. H04B 7/18513; H04W 72/21; H04W 74/004; H04W 74/0833; H04L 1/0003; H04L 5/0007
USPC .......................................................... 370/320
See application file for complete search history.

(56) References Cited

U.S. PATENT DOCUMENTS

| | | | |
|---|---|---|---|
| 2007/0155390 A1 | 7/2007 | Kodikara Patabandi et al. | |
| 2008/0187136 A1* | 8/2008 | Zhang ................... | H04L 1/1812 380/279 |
| 2010/0099370 A1* | 4/2010 | Nichols .................. | H01Q 21/20 343/893 |

(Continued)

*Primary Examiner* — Chi Tang P Cheng
(74) *Attorney, Agent, or Firm* — Polsinelli PC

(57) ABSTRACT

In an embodiment, a user terminal includes a communication module (CM) configured to generate an initial network entry request; an antenna assembly configured to find, in response to the initial network entry request, a satellite based on a search of a sky. The search of the sky includes sequentially changing a beam pointing direction of the antenna assembly. The satellite is assigned to downlink to a geographic cell associated with the user terminal. The user terminal includes a media access control (MAC) layer component configured to generate an uplink radio frame including a random access channel (RACH) request associated with the initial network entry request at a particular portion of the uplink radio frame for the satellite.

18 Claims, 10 Drawing Sheets

(56) References Cited

U.S. PATENT DOCUMENTS

| | | | | |
|---|---|---|---|---|
| 2011/0007720 A1* | 1/2011 | Shimizu | ................ | H04W 74/02 |
| | | | | 370/336 |
| 2012/0257588 A1* | 10/2012 | Umeda | .................. | H04L 5/143 |
| | | | | 370/329 |
| 2018/0343052 A1* | 11/2018 | Lv | ...................... | H04B 7/18513 |

* cited by examiner

INITIAL NETWORK ENTRY TO A COMMUNICATIONS SYSTEM

CROSS-REFERENCE TO RELATED APPLICATIONS

This application is a continuation of U.S. patent application Ser. No. 17/334,546, filed on May 28, 2021 entitled "INITIAL NETWORK ENTRY TO A COMMUNICATIONS SYSTEM", which claims priority to U.S. Provisional Patent Application No. 63/032,868, filed on Jun. 1, 2020, entitled "INITIAL NETWORK ENTRY TO A COMMUNICATIONS SYSTEM", the contents of which are hereby incorporated by reference in their entirety and for all purposes.

TECHNICAL FIELD

The present disclosure generally relates to wireless communications systems and, more specifically, to performing an initial network entry to a communication system.

BACKGROUND

In wireless communications systems, information is relayed from an originating device to a destination device via one or more intermediating devices, thereby forming a communication chain. The communication link between one or more respective pairs of devices in the communication chain can comprise wireless communication links. If the information comprises a request, data for which receipt is to be acknowledged, a command for which receipt is to be acknowledged, and/or the like, appropriate information is relayed in reverse back to the originating device. Typically many such one-way or round-trip communications occur for the originating device.

In order for ground equipment to communicate information within the communications system under normal operating conditions, such ground equipment first registers with the communications system. In satellite communications systems, the registration process for the ground equipment occurs via a satellite. Registering confers requisite checks for both the ground equipment and satellite, and provides the ground equipment with various resource allocation information for the ground equipment to properly transmit and receive communications without conflicting with other communications within the communications system (e.g., communications between other ground equipment and the same satellite).

Ground equipment has limited or no information about the rest of the communications system, especially at start up, since network information such as satellite locations or orbiting schedule is provided by satellites to which they are able to establish and maintain a communication link.

BRIEF DESCRIPTION OF THE DRAWINGS

The foregoing aspects and many of the attendant advantages of the embodiments of the present disclosure will become more readily appreciated as the same become better understood by reference to the following detailed description, when taken in conjunction with the accompanying drawings, wherein.

DETAILED DESCRIPTION

Figure 1:
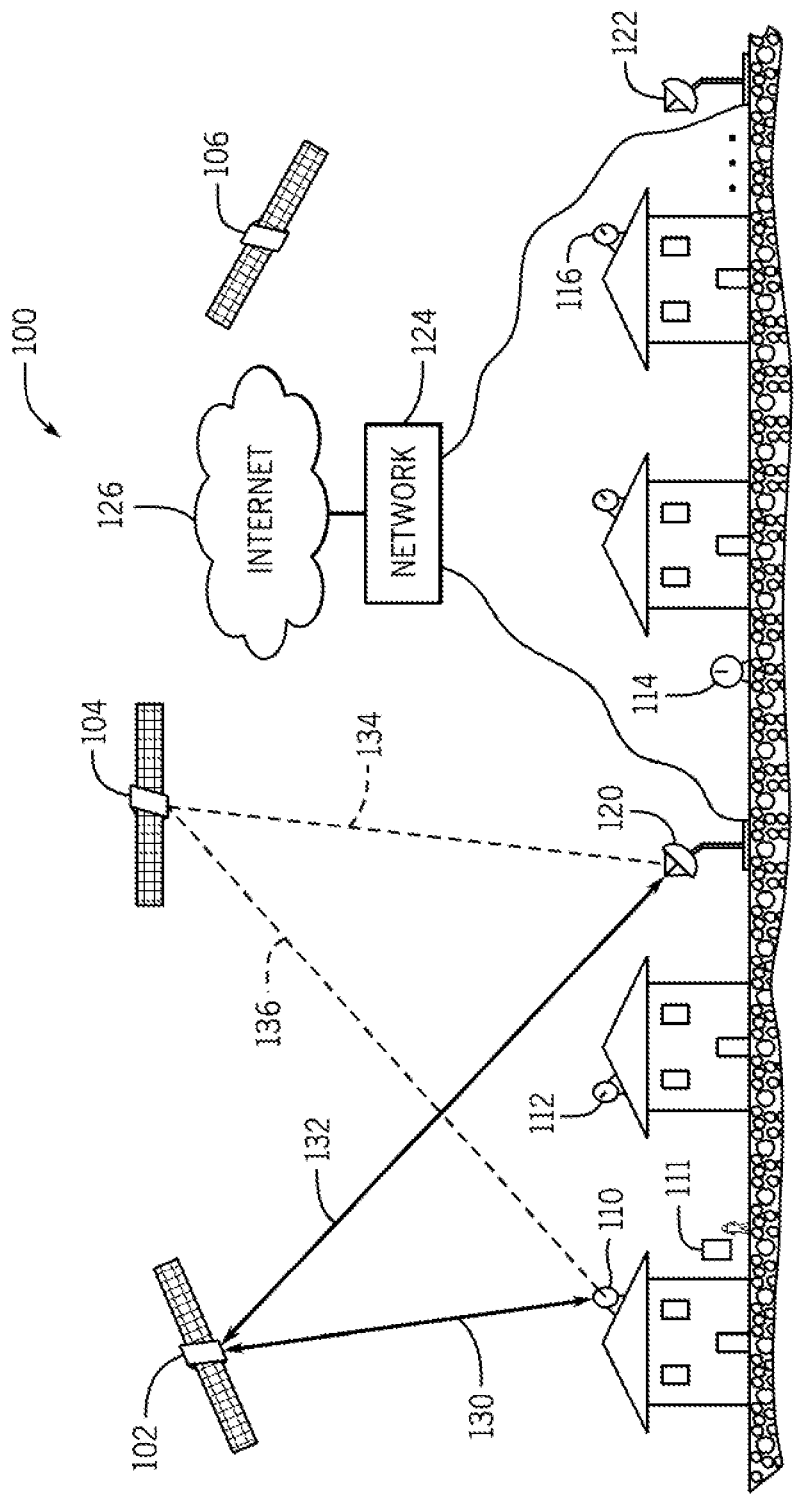
FIG. 1 illustrates a diagram showing an example wireless communications system in accordance with various aspects of the present disclosure.

As previously explained, in order for ground equipment to communicate information within a wireless communications system under normal operating conditions, such ground equipment registers with the communications system. Registering confers requisite checks for both the ground equipment and satellite and can provide the ground equipment with various resource allocation information for the ground equipment to transmit and receive communications without conflicting with other communications within the communications system (e.g., communications between other ground equipment and the same satellite).

Ground equipment has limited or no information about the rest of the communications system, especially at start up, since network information such as satellite locations or orbiting schedule is provided by satellites to which they are able to establish and maintain a communication link. It would be advantageous for ground equipment associated with a user having little or no information about the network to be able to initiate registration or network entry. It would also be advantageous for ground equipment associated with a user to be able to properly enter a network of the communications system without having prior knowledge of satellite positions in a relative short time period. In some aspects, systems and techniques of the present disclosure are directed to these and other improvements in network entry to communications systems or portions thereof.

In at least some examples, systems, and methods are disclosed relating to initial network entry techniques to a communications system. These and other aspects of the present disclosure will be more fully described below.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Additionally, it should be appreciated that items included in a list in the form of "at least one A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C).

Language such as "top surface", "bottom surface", "vertical", "horizontal", and "lateral" in the present disclosure is meant to provide orientation for the reader with reference to the drawings and is not intended to be the required orientation of the components or to impart orientation limitations into the claims.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, it may not be included or may be combined with other features.

Many embodiments of the technology described herein may take the form of computer- or processor-executable instructions, including routines executed by a programmable computer, processor, controller, chip, and/or the like. Those skilled in the relevant art will appreciate that the technology can be practiced on computer/controller systems other than those shown and described above. The technology can be embodied in a special-purpose computer, controller, or processor that is specifically programmed, configured or constructed to perform one or more of the computer-executable instructions described above. Accordingly, the terms "computer," "controller," "processor," or the like as generally used herein refer to any data processor and can include Internet appliances and hand-held devices (including palm-top computers, wearable computers, cellular or mobile phones, multi-processor systems, processor-based or programmable consumer electronics, network computers, mini computers, and the like). Information handled by these computers can be presented at any suitable display medium, including an organic light emitting diode (OLED) display or liquid crystal display (LCD).

FIG. 1 illustrates a diagram showing an example wireless communications system 100 in accordance with various aspects of the present disclosure. System 100 comprises a satellite-based communications system including a plurality of satellites orbiting Earth in, for example, a non-geostationary orbit (NGO or NGSO) constellation. It is understood that system 100 can also comprise any of a variety of wireless communications systems such as, but not limited to, a low earth orbiting (LEO) communications system, a non-earth based communications system, a ground-based communications system, a space-based communications system, and/or the like.

Of the plurality of satellites comprising the satellite constellation, at least three satellites of the plurality of satellites (e.g., satellites 102, 104, and 106) are shown in FIG. 1 for illustrative purposes. System 100 further includes ground or terrestrial based equipment configured to communicate with the plurality of satellites, such equipment including a plurality of user equipment and a plurality of gateways. User equipment 110, 112, 114, and 116 of the plurality of user equipment are shown in FIG. 1. Gateways 120, 122 of the plurality of gateways are also shown in FIG. 1. Each of the satellites, user equipment, and gateways within system 100 is also referred to as a node, system node, communication node, and/or the like.

Each user equipment of the plurality of user equipment is associated with a particular user. User equipment is configured to serve as a conduit between the particular user's device(s) and a satellite of the plurality of satellites which is in communication range of the user equipment, such that the particular user's device(s) can have access to Internet 126 via a network 124. Each user equipment is particularly positioned in proximity to the associated user's device(s). For example, user equipment 110, 112, and 116 are located on the respective users' building roof and user equipment 114 is located on a yard of the user's building. A variety of other locations are also contemplated for the user equipment. User equipment may also be referred to as user terminals, end use terminals, end terminals, user ground equipment, ground-based communication device, and/or the like.

At any given time, a communication link established between a particular satellite and a particular user equipment facilitates access to Internet 126 by the user associated with the particular user equipment. One or more user devices (e.g., a smartphone, a tablet, a laptop, an Internet of Things (IoT) device, wearable device, and/or the like) is in wired or (short range) wireless communication with user equipment 110. If, for example, the user requests a web page via a user device 111, the user device relays the request to user equipment 110. User equipment 110 can establish a communication link 130 to the satellite 102 and transmit the request. Satellite 102, in response, establishes a communication link 132 with an accessible gateway 120 to relay the request. The gateway 120 has wired connections to the network 124. Network 124 has wired connections to Internet 126. The request is relayed from gateway 120 to network 124 to Internet 126. The data associated with rendering the requested web page is returned in the reverse path, from the network 124, gateway 120, communication link 132, satellite 102, communication link 130, user equipment 110, and to the originating user device 111. The requested web page is then rendered on the originating user device 111.

If satellite 102 moves out of position relative to user equipment 110 before the requested data can be provided to user equipment 110 (or otherwise becomes unavailable), then gateway 120 establishes a communication pathway 134, 136 with a different satellite, such as satellite 104, to provide the requested data.

In some embodiments, network 124 comprises a private network and the Internet 126 comprises a public network. Network 124 can comprise a point of presence (PoP). Network 124 can include servers, routers, network switches, multiplexers, central control systems, and/or other network interface equipment. One or more of network 124 can be included in system 100. For instance, the number of network 124 can be equal to or less than the number of gateways of the plurality of gateways.

In some embodiments, one or more gateway of the plurality of gateways comprises repeaters that lack a wired connection to the network 124. A repeater is configured to relay communications to and/or from a satellite that is a different satellite from the one that directly communicated with a user equipment or gateway. A repeater is configured to be part of the communication pathway between a user equipment and gateway. A repeater may be accessed in cases where a satellite does not have access to a gateway, and thus has to send its communication to another satellite that has access to a gateway via the repeater. Repeaters can be located terrestrially, on water (e.g., on ships or buoys), in airspace below satellite altitudes (e.g., on an airplane or balloon), and/or other Earth-based locations. Alternatively, repeaters may be optional if the "repeater," relaying, and/or buffering functionalities are handled by network 124. Accordingly, the plurality of gateways may also be referred to as Earth-based network nodes, Earth-based communication nodes, and/or the like.

In some embodiments, one or more transmitter system and one or more receiver system are included in each user equipment, satellite, and gateway (and repeater) of system 100. A transmitter system can include, without limitation, components to generate and transmit radio frequency (RF) signals based on data signals provided by a modem (e.g., beamforming components, signal encoding components, baseband section, modulation section, antenna, and associated circuitry). A receiver system can include, without limitation, components to receive RF signals and recover data signals from the received RF signals to provide to a modem (e.g., signal decoding components, baseband section, modulation section, antenna, and associated circuitry). If a node includes more than one transmitter system, the respective transmitter systems may be the same or different from each other. More than one receiver system included in a node may similarly be the same or different from each other.

Wireless communication using NGO satellite constellations poses certain challenges for ground-based user equipment. In contrast to geosynchronous satellites, in which each satellite appears at a fixed point in the sky, NGO satellite constellations are composed of satellites that rapidly move across the sky in different directions relative to the ground. The user equipment finds and tracks these satellites to establish and maintain wireless communication with them.

Figure 2:
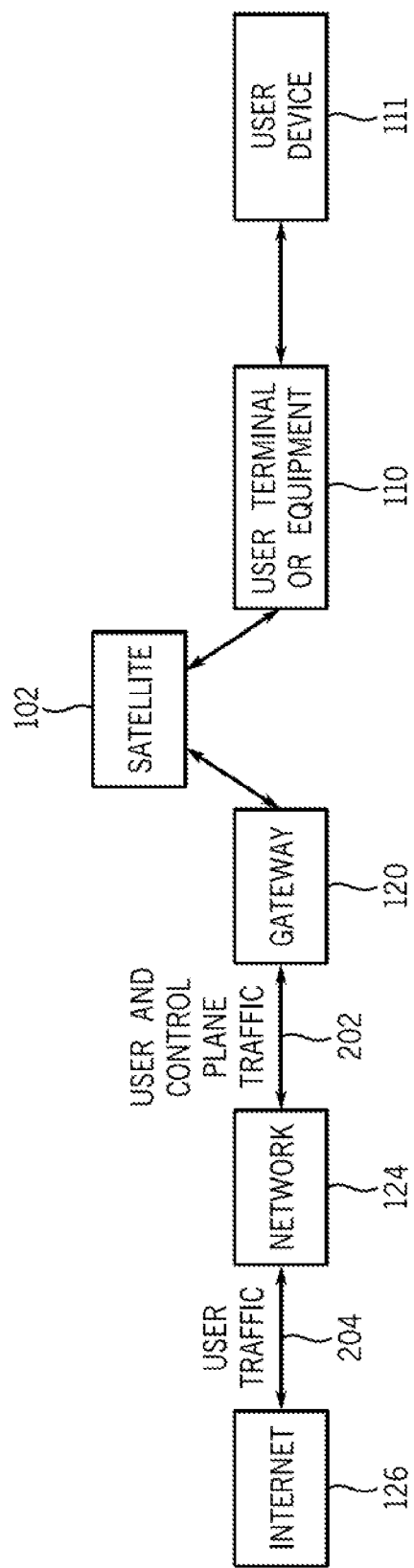
FIG. 2 illustrates a block diagram showing a subset of nodes included in the system of FIG. 1 in accordance with various aspects of the present disclosure.

FIG. 2 illustrates a block diagram showing a subset of nodes included in the system 100 in accordance with various aspects of the present disclosure. As shown, a bi-directional communication link is to be established and maintained between each pair of nodes (e.g., between user device 111 and user equipment 110, between user equipment 110 and satellite 102, etc.), as will be described in detail below. A communication link 202 transports user and control plane traffic information between gateway 120 and network 124. A communication link 204 transports user traffic between network 124 and Internet 126. User equipment 110 is also referred to as a user terminal or UT. Satellite 102 is also referred to as a SAT. Gateway 120 is also referred to as a GW.

Figure 3A:
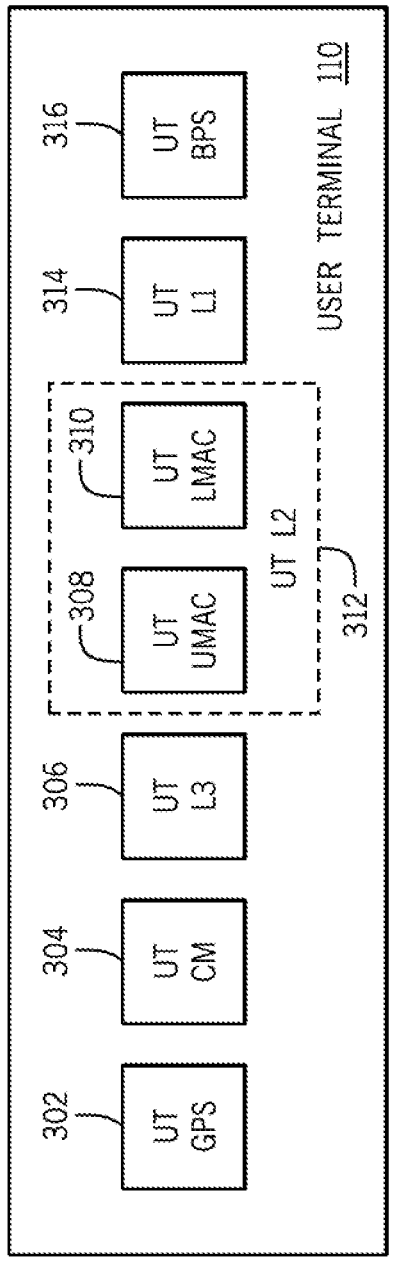
FIG. 3A illustrates a block diagram showing example components included in the user terminal or equipment associated with initial network entry in accordance with various aspects of the present disclosure.

FIG. 3A illustrates a block diagram showing example components included in the user terminal or equipment 110 associated with initial network entry in accordance with various aspects of the present disclosure. In some embodiments, user terminal 110 includes, without limitation, a user terminal (UT) global positioning system (GPS) 302, a UT connection manager (CM) 304, a UT layer 3 (L3) 306, a UT upper media access control (UMAC) 308, a UT lower media access control (LMAC) 310, a UT layer 1 (L1) 314, and a UT beam pointing service (BPS) 316.

UT GPS 302 includes a GPS receiver (e.g., an integrated circuit (IC) chip) that is configured to detect the geographic location of the user terminal 110. UT GPS 302 comprises at least a portion of an inertial measurement unit (IMU) included in the user terminal 110, in some embodiments. Or UT GPS 302 can comprise a separate component from an IMU. UT GPS 302 can comprise other types of position determining system component than GPS. UT CM 304 is configured to manage establishing a connection to the network 124 and the associated information exchange with satellite 102 for initial network entry, as will be described in detail below. Initial network entry may be initiated if user terminal 110 is starting up for the first time, rebooted, moved to a different location after initial network entry was previously completed, loses a connection to the network for whatever reason, and/or the like.

UT L3 306, UT UMAC 308, UT LMAC 310, and UT L1 314 comprise different abstraction layers (or sublayers) of an Open Systems Interconnection (OSI) model, which is a conceptual model or construct to characterize the communication functions or protocols implemented in the system 100 independent of its underlying structures and technology. A given layer serves the layer above it and is served by the layer below it. A given layer receives data from the layer below and provides data to the layer above. The degree of abstraction increases the higher the layer within the OSI model.

UT L1 314 comprises the lowest layer of the OSI model. UT L1 314 is also referred to as a physical layer (PHY layer) and is associated with orthogonal code based signals or waveforms used for communications within the system 100. The orthogonal code based signals or waveforms have a particular signal or waveform structure such as a particular radio frame structure and the substructures within the radio frame. Data communicated between nodes of system 100 (e.g., payload data, downlink timing allocations, uplink timing allocations, scheduling information, resource block allocations, satellite ephemeris, commands, acknowledgements, requests, etc.) are carried in particular portions of each radio frame in the time and frequency domains. As an example, the orthogonal code based signals or waveforms can comprise orthogonal frequency division multiplexing (OFDM) signals or waveforms.

UT UMAC 308 and UT LMAC 310 comprise sublayers of a UT layer 2 (L2) 312. UT L2 312 is the layer immediately above UT L1 314. UT L2 312 is configured to abstract data from UT L1 314 and perform data encapsulation functions to form data packets suitable for UT L3 306. In some embodiments, UT L2 312 is configured to: (a) encapsulate data packets from UT L3 306 and add L2 headers suitable for UT L1 314, at the transmitter side, (b) remove L2 headers and decapulsate packets from UT L1 314 suitable for UT L3 306, at the receiver side, and (c) generate (Tx) and/or incorporate (Rx) control signaling messages (e.g., RACH, UL-map, etc.). UT L2 312 is also referred to as a MAC layer.

UT L3 306 comprises a layer immediately above UT L2 312. UT UMAC 308 is disposed closer to UT L3 306 than UT LMAC 310. UT L3 306 is also referred to as a network layer or a higher layer of the OSI model. UT L3 306 is configured to facilitate: (a) generation and transport of data packets from UT L2 312 to other nodes, devices, or networks, such as with satellite 102, and (b) routing of data packets received from other nodes, devices, or networks to lower layers of the OSI model according to intended destinations.

UT BPS 316 comprises circuity, antenna(s), electrical components, processors, algorithms, and/or other components associated with generation and transmission of transmit beams, receiving and processing of receive beams, and the digital interface connecting to UT L1 314. UT BPS 316 includes, without limitation, beamforming components, beam steering controller components, transmitter components, receiver components, antennas, and/or the like.

Figure 3B:
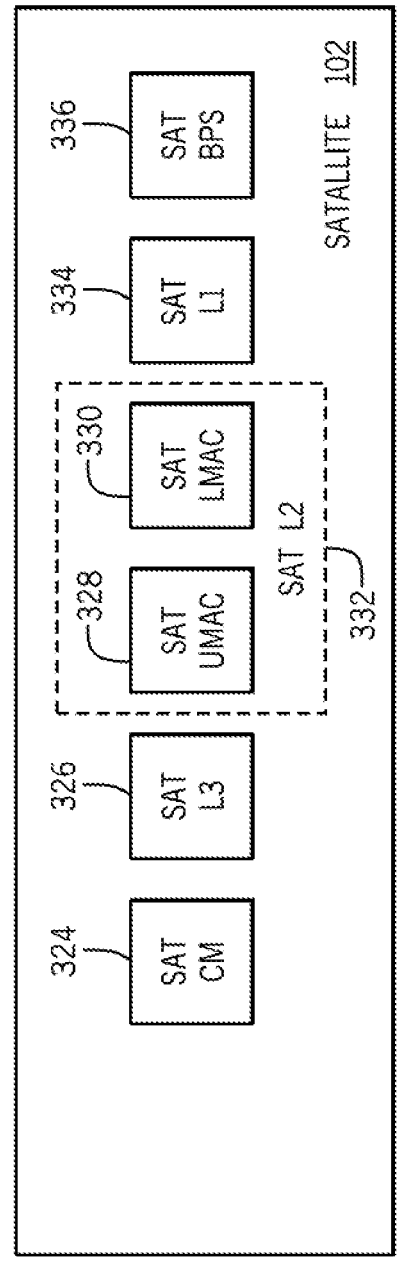
FIG. 3B illustrates a block diagram showing example components included in the satellite associated with initial network entry in accordance with various aspects of the present disclosure.

FIG. 3B illustrates a block diagram showing example components included in the satellite 102 associated with initial network entry in accordance with various aspects of the present disclosure. In some embodiments, satellite 102 includes, without limitation, a satellite (SAT) CM 324, a SAT L3 326, a SAT UMAC 328, a SAT LMAC 330, a SAT L1 334, and a SAT BPS 336. SAT UMAC 328 and SAT LMAC 330 comprise sublayers of a SAT layer 2 (L2) 332. SAT CM 324, SAT L3 326, SAT UMAC 328, SAT LMAC 330, SAT L2 332, SAT L1 334, and SAT BPS 336 are capable of performing operations similar to respective UT CM 304, UT L3 306, UT UMAC 308, UT LMAC 310, UT L2 312, UT L1 314, and UT BPS 316. Moreover, one or more of SAT CM 324, SAT L3 326, SAT UMAC 328, SAT LMAC 330, SAT L2 332, SAT L1 334, or SAT BPS 336 is capable of performing or performs additional operations relative to user terminal 110 because of the satellite's additional responsibilities to communicate with more than one user terminal simultaneously, having more than one beam, is a full duplex mode node (while user terminal 110 can be a half duplex mode node), communicate with gateway 120, and/or the like.

In some embodiments, one or more of components 302-316 and 324-336 (or a portion thereof) comprises one or more instructions embodied within a tangible or non-transitory machine (e.g., computer) readable storage medium, which when executed by a machine causes the machine to perform the operations described herein. One or more processor can be included in each of user terminal 110 or satellite 102 (not shown) to execute one or more of components 302-316 and 324-336 (or a portion thereof). Components 302-316 and 324-336 (or a portion thereof) can be referred to as modules, engines, software, routines, code, applications, programs, and/or the like. In alternative embodiments, one or more of components 302-316 and 324-336 (or a portion thereof) can be implemented as firmware or hardware such as, but not limited to, an application specific integrated circuit (ASIC), programmable array logic (PAL), field programmable gate array (FPGA), and/or the like. In other embodiments, one or more of components 302-316 and 324-336 (or a portion thereof) can be implemented as software while other of the components 302-316 and 324-336 (or a portion thereof) can be implemented as firmware and/or hardware.

Each of the user terminals of system 100 initiates and completes initial network entry (INE) with a satellite before normal or regular communications can commence for the user terminal within the system 100. A user terminal (e.g., user terminal 110) may initiate initial network entry process if the user terminal is turned on for the first time (as part of installation), if the user terminal is moved to a new location after initial network entry has been previously completed (e.g., user moves to a new residence and relocates his or her user terminal), and/or the like. At the start of initial network entry operations, user terminal 110 has little or no information about the system 100.

From the user terminals perspective, satellite positions are usually unknown prior to contact with the satellite constellation, especially if the satellites are the user terminals' sole source of data connectivity. Even if a given user terminal established contact with one or more satellites in the past, previous knowledge of satellite orbits (ephemeris) quickly becomes outdated, since the exact satellite trajectories are subject to change depending on a number of factors such as, but not limited to, the condition and health of constituent satellites, engine burn plans, operating requirements, and/or the like. Low-Earth orbit satellites, in particular, can be affected by unpredictable drag forces and have orbital trajectories that can be difficult to extrapolate very far into the future.

Each satellite within the constellation can operate a plurality of beams, with one or more beams of the plurality of beams operating at a different frequency from each other. User terminals typically do not know the particular operating frequency(ies) of the satellite beams. This means that even if a user terminal finds a satellite beam, the user terminal may not be able to decode the downlink beam received from the satellite until the operating frequency has been determined.

The three-dimensional orientation of the antenna (e.g., a phased array antenna) included in the user terminal is also unknown prior to contact with a satellite. The antenna beam—transmit beam and/or receive beam—is configured or electronically steered to have a particular beam pointing direction, which is a function of the user terminal's own orientation.

Accordingly, at start of initial network entry operations, satellite positions are unknown to the user terminal 110, satellite operating frequencies are unknown to user terminal 110, and the orientation of user terminal 110 (and in particular, of its antenna) is unknown. Nevertheless, user terminal 110 (and all of the remaining user terminals of system 100) is capable of completing initial network entry as disclosed herein.

Figure 4A:
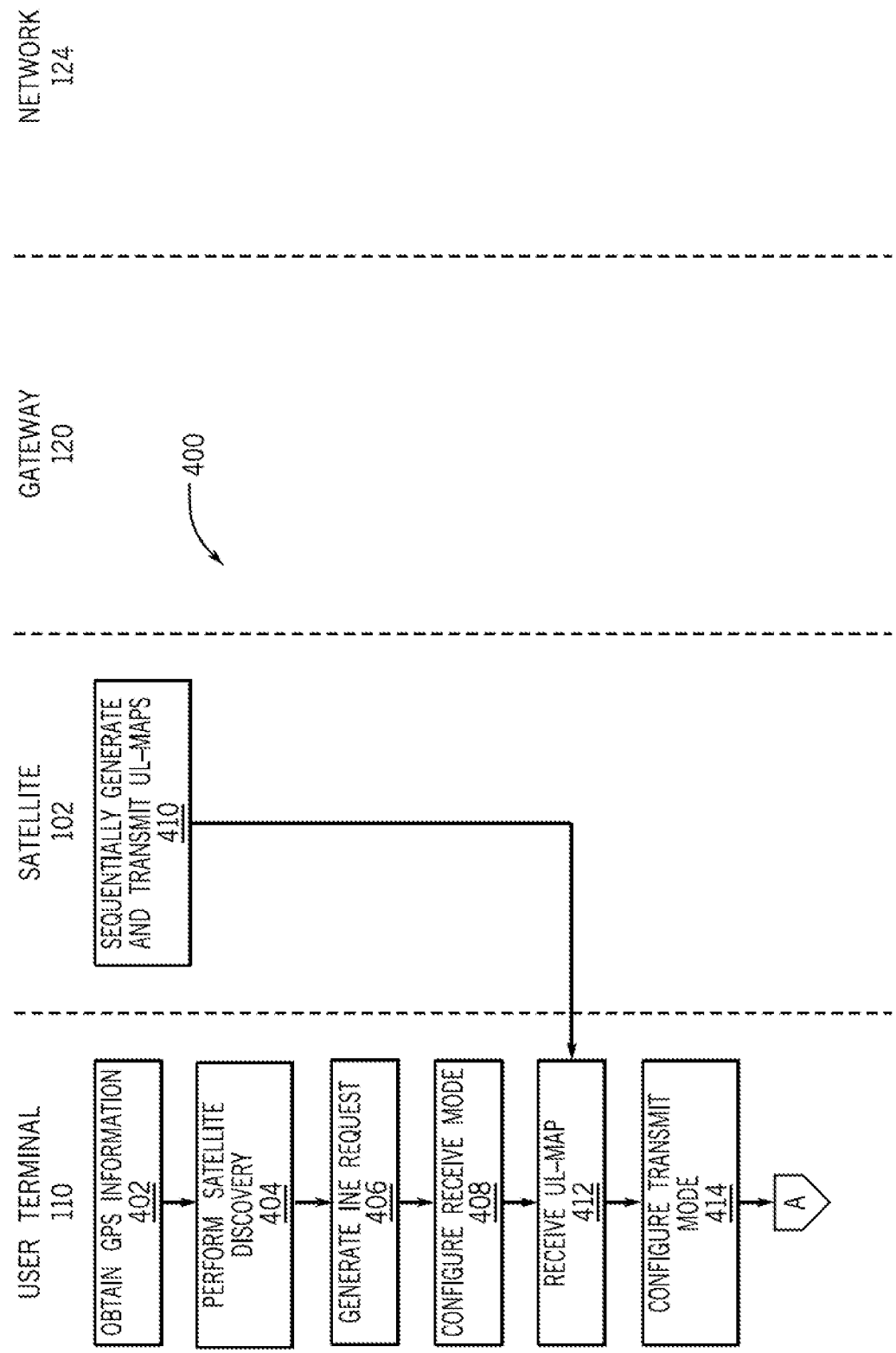
FIGS. 4A-4C illustrate a flow diagram showing a process for performing initial network entry for a user terminal in accordance with various aspects of the present disclosure.
Figure 4B:
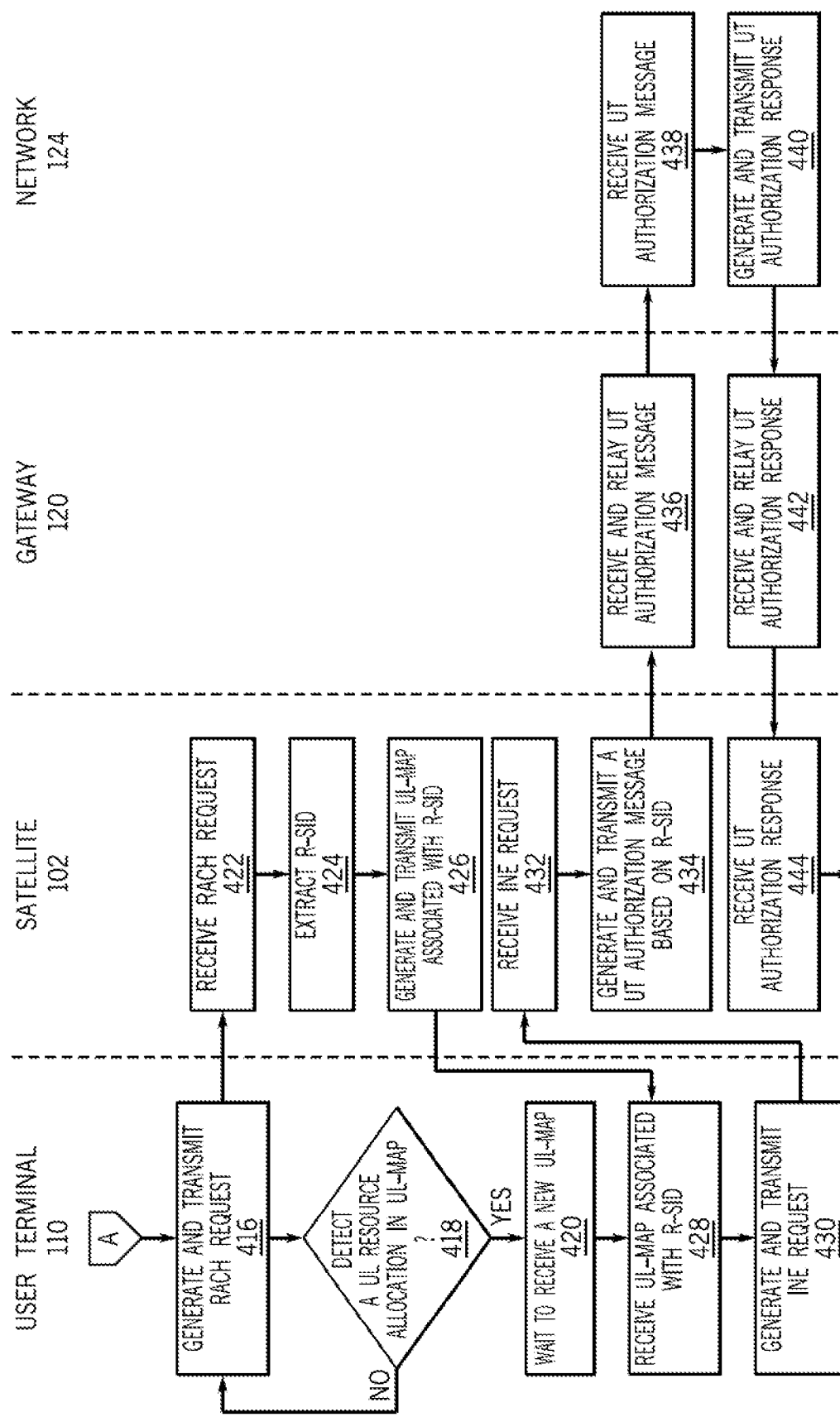
Figure 4C:
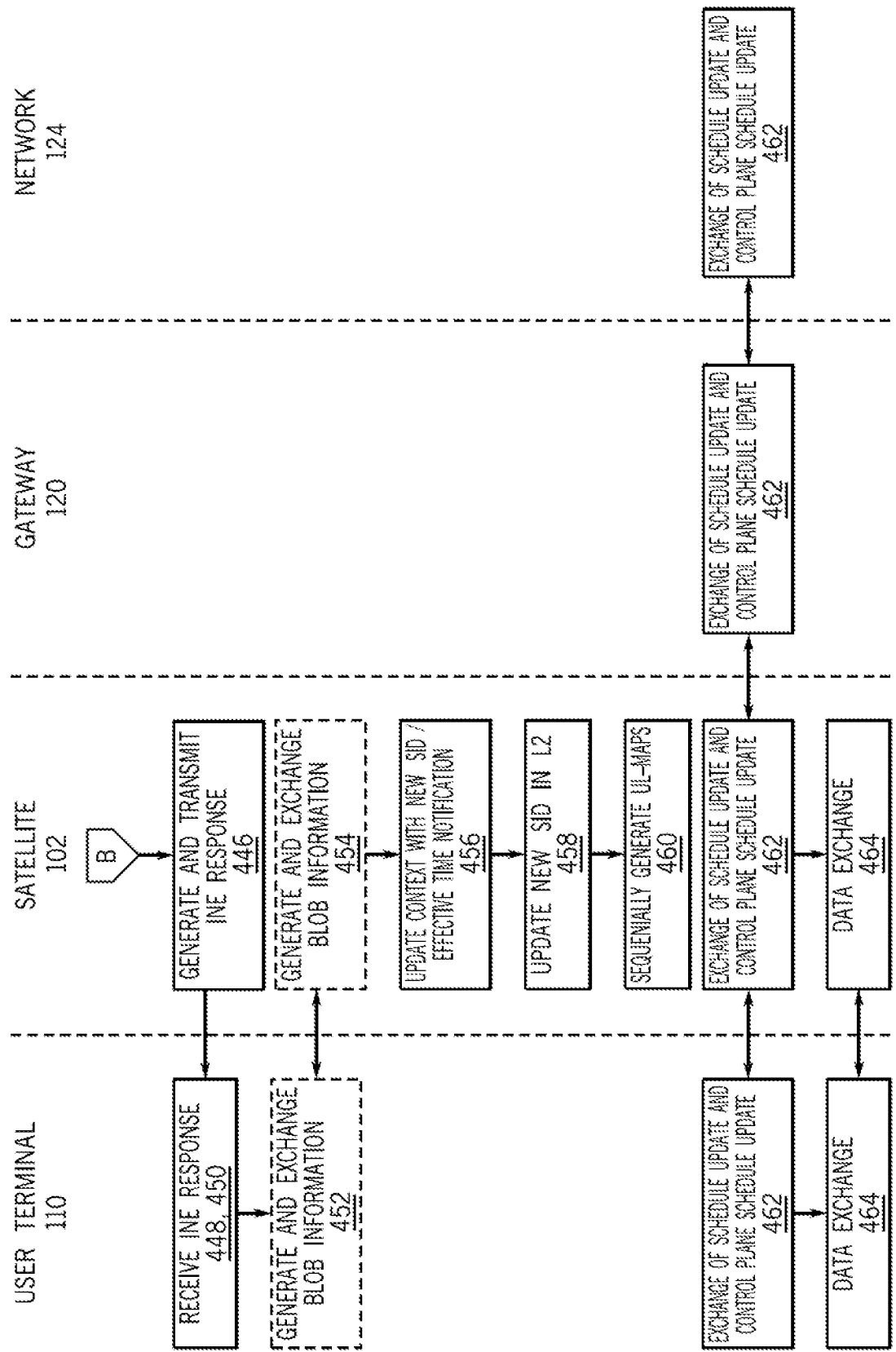
Figure 5:
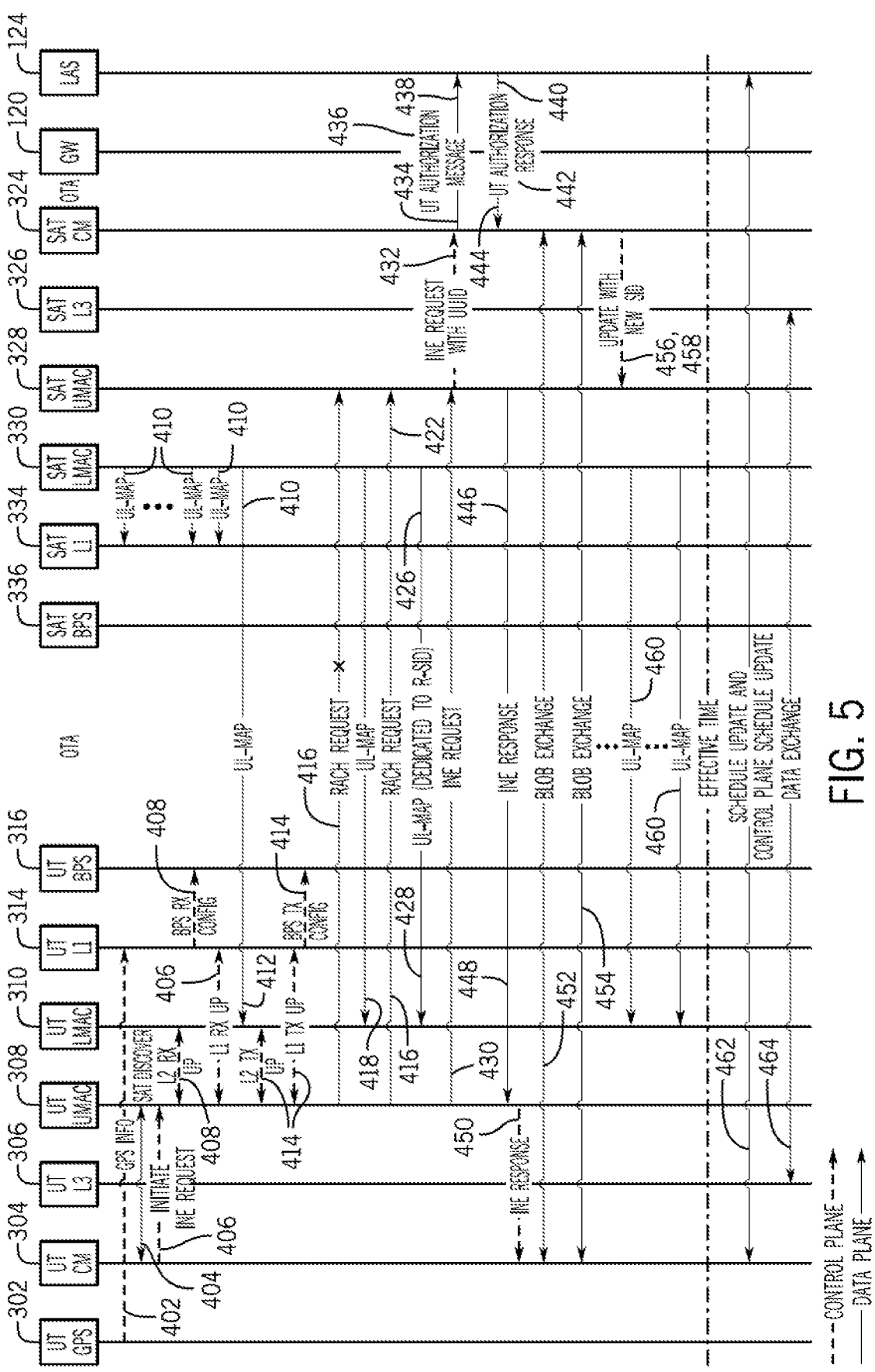
FIG. 5 illustrates a timing diagram relating to the process of FIGS. 4A-4C in accordance with various aspects of the present disclosure.

FIGS. 4A-4C illustrate a flow diagram showing a process 400 for performing initial network entry for user terminal 110 in accordance with various aspects of the present disclosure. FIG. 5 illustrates a timing diagram 500 relating to the process 400 in accordance with various aspects of the present disclosure. FIGS. 4A-4C and 5 are described below in conjunction with each other.

At block 402, UT GPS 302 is configured to obtain GPS information or data associated with user terminal 110. The obtained GPS information is provided to UT LI 314.

At block 404, satellite discovery is performed. Satellite discovery can include user terminal 110 conducting a scan or search of the sky to find any satellite of the constellation assigned to downlink to the geographic cell or sector associated with user terminal 110. In some examples, the UT CM 304 can send a satellite discovery request to the UT UMAC 308 to initiate the satellite discovery, and the UT UMAC 308 can return satellite ephemeris information (e.g., satellite location, timing, etc.) to the UT CM 304. In some examples, UT BPS 316 can use the satellite ephemeris information to conduct the scan or search. The scan or search can include sequentially changing the beam pointing direction (also referred to as the beam pointing vector) of the receive antenna included in the user terminal 110 in accordance with a pre-defined scan or search pattern.

At each beam pointing direction or vector, UT BPS 316 can wait long enough to receive a possible downlink signal from a satellite before changing to the next beam pointing direction. If no downlink signal is detected from the scan, the scan can be repeated with UT BPS 316 set to a different satellite frequency or other parameter. If a downlink signal is detected, another scan or search may be performed around the beam pointing direction at which the downlink signal was detected (this scan/search can include a finer scan than the previous scan/search) to refine the beam pointing direction to a direction associated with the highest (or higher) signal quality strength. At the conclusion of satellite discovery, a satellite has been found (e.g., satellite 102) and a particular beam pointing direction to establish and maintain a communication link with the found satellite (at least long enough to complete initial network entry) is also known.

At block 406, UT CM 304 generates an initial INE request or initiates an INE request to initiate initial network entry into the system 100. The INE request is provided to UT UMAC 308. At block 408, UT UMAC 308 can configure the user terminal 110 into receive mode. In some cases, the UT CM 304 can generate the initial INE request or initiate the INE request after the UT UMAC 308 configures the user terminal 110 into receive mode. In other cases, the UT CM 304 can generate the initial INE request or initiate the INE request before the UT UMAC 308 configures the user terminal 110 into receive mode. For example, in some cases, the UT UMAC 308 can configure the user terminal 110 into receive mode in response to receiving the INE request. Configuring or switching to receive mode can include readying various hardware, firmware, and/or software components associated with receiving and processing RF signals. For example, without limitation, UT UMAC 308 exchanges L2 RX Up messages or information with UT LMAC 310; followed by UT UMAC 308 exchanging L1 RX Up messages or information with UT L1 314; and then UT L1 314 generating and sending BPS RX Configuration messages or information to UT BPS 316.

Satellite 102 can be configured to generate and broadcast a variety of network-related information or commands to one or more cells (or portion of the cell(s)) covered by satellite 102. As the network-related information updates over time, such updates can also be provided to the group of user terminals located within the one or more cells (or portion of the cell(s)) associated with satellite 102. An example of such network-related information can include uplink-mapping information (UL-map) included in a downlink radio frame. The UL-map can include, for example and without limitation, information which indicates to each user terminal of the group of user terminals the portion(s) of the uplink (UL) radio frame allocated to that user terminal, and scheduling information indicating when that user terminal is to transmit an uplink radio frame to satellite 102 so that the uplink radio frame is received by the satellite 102 at the proper time relative to the uplink radio frames transmitted by the other user terminals of the group of user terminals. Each user terminal (already authenticated to the network) can be provided a dedicated grant for the uplink. For new user terminals to enter the network, the UL-map can also include an INE random access procedure (RACH) resource allocation in lieu of the dedicated grant. The UL-map can include additional information relating to uplink radio frame usage by each user terminal of the group of user terminals.

While blocks 402-408 are performed, SAT LMAC 330 is configured to generate and provide a UL-map to SAT L1 334, at block 410. The UL-map is transmitted by satellite 102 (e.g., via SAT BPS 336) over-the-air. In some examples, user terminal 112 is unable to detect the UL-map until the satellite discovery at block 404. At block 410, a UL-map is sequentially generated and transmitted as updates occur, on a periodic basis, and/or other pre-defined schedule.

At block 412, a UL-map generated by SAT LMAC 330 and transmitted or broadcast over-the-air (OTA) is received by user terminal 110. In response to receipt of the UL-map, UT UMAC 308 configures the user terminal 110 into transmit mode, at block 414. Configuring or switching to transmit mode can include readying various hardware, firmware, and/or software components associated with processing data signals for transmission. For example, without limitation, UT UMAC 308 exchanges L2 TX Up messages or information with UT LMAC 310; followed by UT UMAC 308 exchanging L1 TX Up messages or information with UT L1 314; and then UT L1 314 generating and sending BPS TX Configuration messages or information to UT BPS 316.

With the user terminal 110 in transmit mode, UT UMAC 308 is configured to start the RACH procedure by generating a RACH request and causing UT BPS 316 to transmit the RACH request, at block 416. In some cases, the RACH request may include a short UT address (also referred to as a RACH-service identifier (R-SID)). The received UL-map provides information (e.g., the INE RACH resource allocation) on when and where in an uplink radio frame to make the RACH request. The RACH request may be received by satellite 102, at block 422. If the RACH request is properly received by satellite 102, then satellite 102 is configured to allocate UL resources to the user terminal 110 in the UL-map for the next radio frame after authentication of the user terminal 110 with the network 124. User terminal 110 is registered in SAT L2 332 and included in a UL-map schedule prior to authentication with network 124.

If UL resource allocation for user terminal 110 is not detected in the UL-map (no branch of block 418) in a defined period, then process 400 proceeds to return to block 416 to send another RACH request. If UL resource allocation is detected (yes branch of block 418), then UT LMAC 310 initiates an UT INE request to satellite 102 at block 430 and waits for the next UL-map.

If satellite 102 receives the RACH request from user terminal 110, at block 422, SAT LMAC 330 can extract at least a short UT address (also referred to as a RACH-service identifier (R-SID) included in the RACH request, at block 424. The short UT address is a temporary identifier of the user terminal 110 for INE purposes. In some cases, a RACH request can also include other information such as a unique identification blob for the short UT address, which can be used for contention resolution. In some cases, SAT LMAC 330 can include the extracted short UT address in the following UL-MAP scheduling.

Satellite 102 can allocate a grant for the R-SID in the next UL-map (e.g., the UL resource allocation in the UL-map). The UL-map associated with the short UT address (e.g., R-SID) is generated and transmitted at block 426. Such UL-map is received by user terminal 110 and provided to UT LMAC 310, at block 428. In some embodiments, the UL-map can be a UL-map dedicated to the short UT address.

Because each user terminal sending a RACH request selects its R-SID independent of other user terminals that may also be sending a RACH request at the same time (and also independent of satellites), it is possible for more than one user terminal to attempt to use the same R-SID at the same time. Such situation can be a reason for the RACH requests from those user terminals to be rejected or otherwise not be granted UL resources to continue INE. Such user terminals send another RACH request at a later point in time.

Upon receipt of the UL-map with the R-SID grant or resource allocation, at block 428, UT LMAC 310 decodes the grant or UL resources allocated for the R-SID and facilitates generation and transmission of a UT INE request (also referred to as an INE request) in an uplink radio frame, as block 430. The detected UL resource permits establishing the L2 (MAC) control plane between the user terminal 110 and satellite 102.

If a UT INE request at block 430 is received on the granted UL resource for the extracted short UT address in the following radio frames, at block 432, SAT UMAC 328 initiates an UT INE request to SAT CM 324. Here, the SAT UMAC 328 can send an INE request with a UT identifier (UUID) to SAT CM 324. In some cases, the UT INE request to SAT CM 324 can optionally include optional UT CM blobs. As a response to an UT INE request, SAT CM 324 sends SAT UMAC 328 a response with a new assigned service-identifier (SID) or other unique identifier and other L3 blob configurations, at blocks 436-444. SAT UMAC 328 sends user terminal 110 an UT INE response addressed to R-SID and including the new granted SID/identifier, at block 446.

The short UT address included in the INE request to SAT CM 324 is used by SAT CM 324 to generate a UT authorization message, at block 434. The UT authorization message comprises a request to network 124 to authenticate and register the user terminal 110 to operate within the system 100. The UT authorization message is communicated to network 124 via gateway 120, at blocks 436, 438.

In some embodiments, network 124 includes a label and address service (LAS) component configured to authorize entry of user terminals to the network. LAS component of network 124 performs requisite processing on the information provided in the UT authorization message to authorize (or not authorize) the user terminal 110. Requisite processing includes determination of certain information exchange occurrence between the user terminal 110, satellite 102, and network 124, including certain information exchange between UT CM 304 and SAT CM 324 and between SAT CM 324 and the LAS. If authorization checks are satisfied, LAS component generates a UT authorization response message, at block 440. The UT authorization response message is communicated back to SAT CM 324 via gateway 120, at blocks 442, 444.

If the UT is authorized (positive response is received at block 444), then the satellite 102 is configured to generate and transmit an UT INE response message to the user terminal 110, at block 446. The INE response is addressed to the R-SID specified by the user terminal 110 in the RACH request. If UT UMAC 308 detects a UT INE response, at block 448, UT UMAC 308 generates an INE response message to UT CM 304 indicative of such success, at block 450.

If the UT is unauthorized by network 124 or a failure indication is specified in block 444, then the UT INE response generated and transmitted by satellite 102 to user terminal 110 can be addressed to R-SID, indicate a failure, and optionally actions for the user terminal 110 to perform such as, but not limited to, return to satellite discovery mode, wait for a defined time period before attempting INE again, attempt INE again on a different channel, frequency, or satellite, and/or the like. Such UT INE response or the failure to detect a UT INE response is reported to UT CM 304 so that remedial actions can be taken to complete initial entry into the network.

In some cases, with receipt of a successful INE response, UT CM 304 can optionally generate and exchange blob information with SAT CM 324, at block 452. In some cases, SAT CM 324 can optionally generate and exchange blob information with UT CM 304, at block 454. Components within the same node can also optionally exchange blob information with each other. For example, UT CM 304 exchanges L3 blob information with UT L2 or MAC 312, SAT CM 324 exchanges L3 blob information for user terminal of interest (e.g., user terminal 110) with SAT L2 or MAC 332. Examples of blob information exchanged include, but is not limited to, SID, other identifier or label information, and/or the like. Optionally, if blob information exchange is not completed within a prescribed time period, initial entry into the network may be restarted. Blob information exchange incompletion can be due to a L2 control plane break during the blob exchange because satellite 102 goes out of service, network 124 fails to provide a grant to the user terminal 110, and/or like. In some cases, if UT CM 304 fails to obtain the updated schedule from the LAS within a certain time after the effective time, as will be discussed below, initial network entry process may be restarted.

Exchange of blob information can occur (when implemented) using the L2 control plane established between the satellite 102 and user terminal 110. Control plane is used to exchange control messages between entities.

SAT CM 324 can be configured to facilitate with SAT UMAC 328 to update a context associated with user terminal 110 with the new SID/effective time information, at block 456, and to update the new SID in SAT L2/MAC layer 332, at block 458. The new SID/effective time information is used in future UL-map generation. The new SID replaces the short UT address used for INE purposes. In some cases, UT CM 304 can optionally be configured to facilitate with UT UMAC 308 to perform de-configuring the UT L2/MAC layer 312 (e.g., perform MAC down) and re-configuring the UT L2/MAC layer 312 (e.g., perform MAC up) with the new SID.

Next, satellite 102 continues to sequentially generate and transmit UL-maps, at block 460. Each UL-map can include specification of UL resources allocated to the user terminal 110 and such allocation can be associated with the new SID (the unique identifier of user terminal 110 for normal operations within system 100).

Blocks 462-464 can include one or more operations that are performed after the effective time specified in block 456. Scheduling updates and control plane schedule updates associated with downlink, uplink, operating frequencies, operational states of nodes, and/or the like are generated and/or exchanged between network 124, gateway 120, SAT CM 324, and UT CM 304, at block 462. Data exchanges can also take place between UT L3 306 and SAT L3 326, at block 464. In some examples, the scheduling updates can include the new SID.

Accordingly, a RACH procedure is implemented to configure the L2/MAC control plane between the user terminal 110 and satellite 102. A L2-CM interface is provided at each of the user terminal 110 and satellite 102 in order to exchange control messages between UT CM 304 and SAT CM 324. Prior to completion of initial network entry, the L2 control plane can be available between user terminal 110 and satellite 102. Prior to completion of initial network entry, no data packet exchange can occur between UT CM 304 and LAS included in network 124 on the data plane.

As discussed above, UT UMAC 308 of UT L2/MAC 312 and SAT UMAC 328 of SAT L2/MAC 332 are configured to support random access in the uplink (e.g., communicate a RACH request in the uplink). The random access comprises logical RACH resources, not physical RACH resources. The UL-map provided by satellite 102 specifies where the RACH resources can be located in a UL radio frame transmitted by the user terminal 110 and other user terminals within the same cell. RACH resources for initial network entry are separate from other RACH resources such as for bandwidth request (BR).

Figure 6:
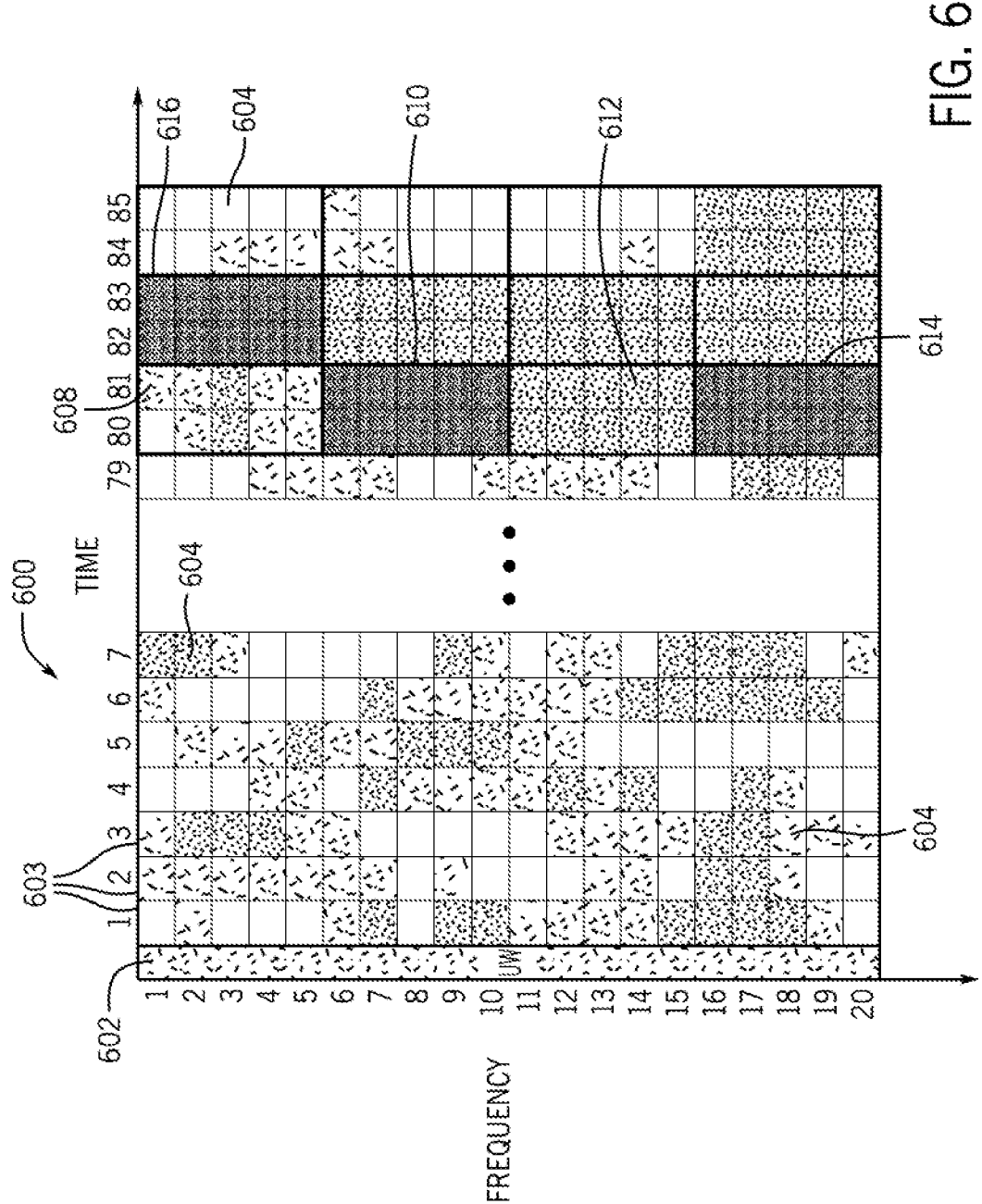
FIG. 6 illustrates an example uplink (UL) radio frame including a plurality of random access channel (RACH) resources in accordance with various aspects of the present disclosure.

FIG. 6 illustrates an example UL radio frame 600 including a plurality of RACH resources in accordance with various aspects of the present disclosure. User terminal 110 generates UL radio frame 600 in accordance with RACH resources for initial network entry specified by a UL-map provided by satellite 102 (e.g., UL-map provided at block 418). The RACH request at block 416 is included in UL radio frame 600.

In some embodiments, UL radio frame 600 comprises a plurality of resource blocks (RBs) 604 composing a grid pattern in the frequency and time domains. Each RB of the plurality of RBs represents a container for a unit of data (or message or request) to be transmitted in the uplink. Each column of RBs comprises an OFDM symbol 603. UL radio frame 600 comprises a plurality of OFDM symbols 603 with the first OFDM symbol 602 comprising a unique word (UW) which identifies the start of a burst of the radio frame.

At the end of UL radio frame 600 in the time domain is a dedicated location for a plurality of RACH resources. Each RACH resource comprises ten contiguous RBs—five RBs in the frequency domain and two RBs in the time domain. 239 data subcarriers, for example, can comprise a RACH resource. A burst synchronization symbol and a channel estimation (CE) symbol can be associated with each RACH resource, the CE symbol providing information about the channel quality. Four RACH resources are included per OFDM symbol 603. A total of twelve RACH resources are shown in FIG. 6, including RACH resources 608, 610, 612, 614, and 616. RACH resources 608, 610, 612, 614 are contiguous to each other in the frequency domain. RACH resources 608 and 616 are contiguous to each other in the time domain.

The number of RBs per RACH resource and the total number of RACH resources per radio frame discussed above are examples only and can differ from those discussed above within the scope of the present disclosure.

In some embodiments, the data contained in a RACH resource (e.g., the RACH request) comprises a MAC protocol data unit (PDU) that is 64 bits encoded using the most conservative modulation and coding scheme (MCS), for example, MCS 0. The MAC PDU is carried on the RACH channel specified by the UL-map. MAC PDU includes a MAC header, zero or more MAC service data units (SDUs) (the payload data), and one or more other fields. The MAC header can include a signaling MAC header, one or more signaling MAC extended headers, and a MAC header cyclic redundancy check (CRC).

UT UMAC 308 generates the MAC PDU encoding the RACH request. UT UMAC 308 selects a RACH resource from among the plurality of RACH resources included in UL radio frame 600 into which to include the MAC PDU comprising the RACH request. Because the user terminals performing initial network entry each independently select a particular RACH resource from among the plurality of RACH resources allocated by the UL-map (as opposed to the satellites making the selection), if more than one user terminal includes a RACH request in the same RACH resource in its uplink radio frames configured to arrive at satellite 102 at the same time, there can be collision of signals such that all of the individual RACH requests may not be able to be extracted. Accordingly, the receiver (Rx) PHY-MAC interface at the satellite 102 is configured to analyze the power strengths of various portions of the received radio frames from the user terminals to detect potential signal collisions between RACH requests in order to only pass quality or "good" RACH requests to SAT UMAC 328 of SAT MAC 332.

Figure 7:
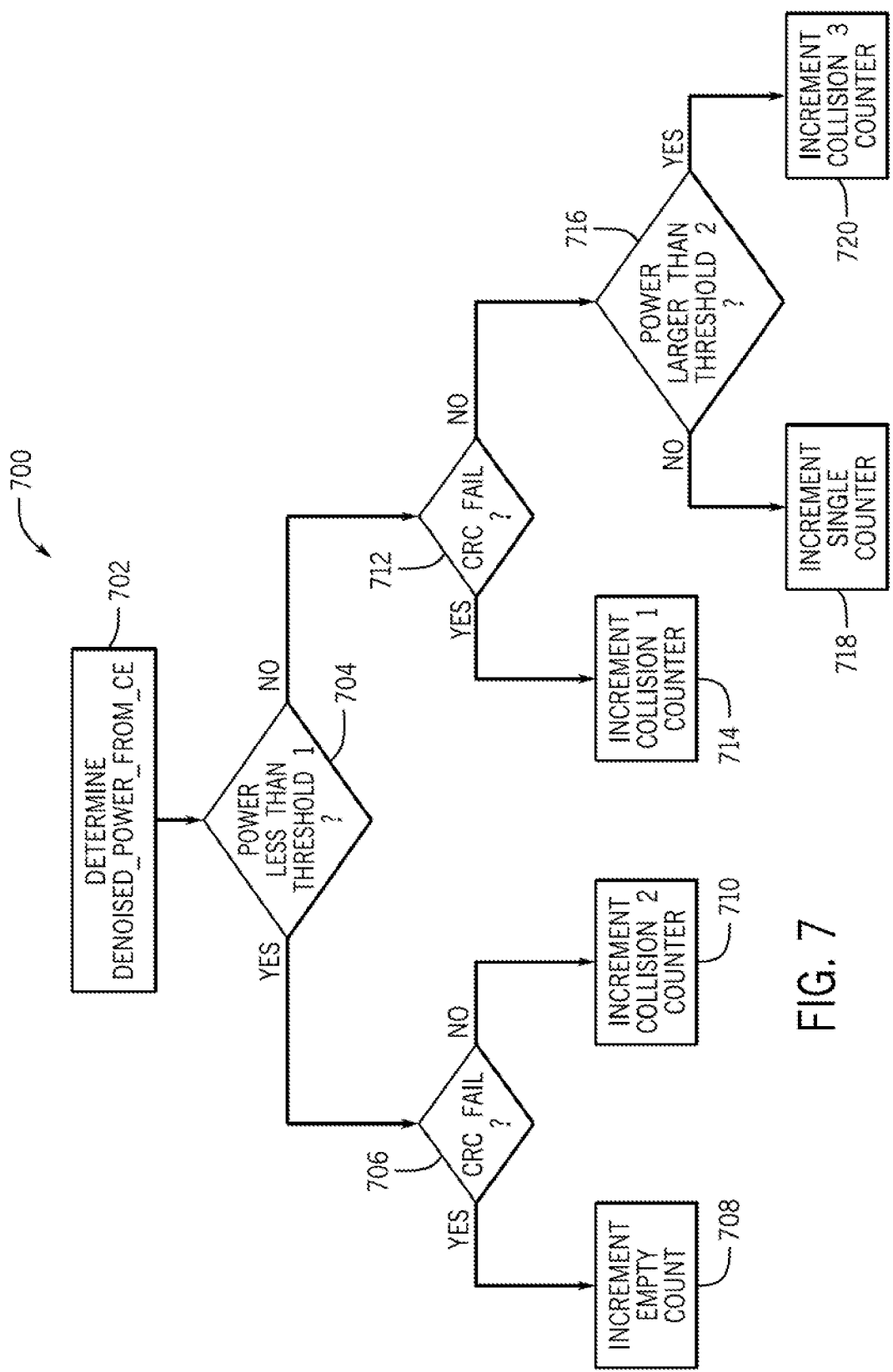
FIG. 7 illustrates an example process for detection of RACH requests in accordance with various aspects of the present disclosure.

FIG. 7 illustrates an example process 700 for detection of RACH requests in accordance with various aspects of the present disclosure. In some embodiments, UL-MAP configuration to remote monitoring modem (RMM) translation occurs in the satellite's 102 receive (Rx) modem. The Rx PHY modem hardware can determine whether received RACH request(s) in each UL radio frame can be sufficiently separated from other RACH requests in the same UL radio frame and is of sufficient signal quality to pass onto the SAT LMAC 330 of SAT MAC 332, when RMM is configured with RACH slots.

A set of RACH slot counters per receive UL radio frame and per each RACH type (INE, BR) is maintained. The set of RACH slot counters comprises a single counter, an empty counter, a collision type 1 counter, a collision type 2 counter, and a collision type 3 counter. At the start of the next radio frame, the counters are reset to zero. RMM is aware of the RACH resources location within each radio frame and the type of RACH resources (INE, BR). If the MAC PDU comprising the RACH request is passed to SAT MAC 332, then SAT L1 334 is also configured to communicate sideband signal information to SAT MAC 332. Sideband signal information comprises whether the PDU was carried in a shared resource or a scheduled resource, if the PDU was carried in a RACH resource, and whether the RACH resource is an INE RACH resource or a BR RACH resource.

At a block 702, RMM (with the PHY hardware performing the calculation) is configured to calculate the denoised power from CE symbols associated with the received MAC PDUs. The denoised power from a burst detection (using burst synchronization symbol) in the time domain is expressed as follows.

$$P_{denoised\_uw} = \text{abs}\left(h_{matched_{out}}(\text{peak} + 256) * h^*_{matched_{out}}(\text{peak})\right) \approx h^2 + \frac{\sigma^2}{128} \quad \text{Eq. (1)}$$

where $h_{matched\_out}(n) =$ $$\frac{conv\left(x_{sync_{in}}(n), uw_{seq}\right)}{128} = h + \tilde{n} \text{ with } x_{sync_{in}}(n)$$

is the time-domain received signal, $uw_{seq}$ is the burst synchronization sequence in the time-domain, $$\text{var}(\tilde{n}) = \frac{\sigma^2}{128},$$

and $\sigma^2$ is the power of AWGN noise.

The denoised power from CE symbols in allocated in RBs of the MAC PDUs in the frequency domain is as follows.

$$P_{denoised\_CE} = abs\left(\frac{\sum h_{ce}(n) * h_{ce}^*(n-1)}{N_{sc}}\right) \approx h^2 \quad \text{Eq. (2)}$$

where $N_{SC}$ is the number of allocation subcarriers in frequency domain of the CE symbol and $h_{ce}$ is the raw received signal per subcarrier of the CE symbol. It is assumed that the noise term among subcarriers is independent of each other.

If the denoised power from CE at block 702 is less than a pre-set threshold (yes branch of block 704), then process 700 proceeds to block 706. At block 706, an error check (e.g., CRC) is performed using the MAC header CRC field information. If the error check fails (yes branch of block 706), then process 700 proceeds to block 708. The PHY hardware has determined that the received RACH requests collide, superimpose, or otherwise commingle with each other in one or both of the frequency or time domains so as to cancel each other. Thus, none of the RACH requests can be resolved or separated from each other; and no RACH requests can be passed to SAT LMAC 330. Accordingly, the empty counter is incremented, at block 708. The empty counter maintains a count of error cases.

If the error check passes (no branch of block 706), then process 700 proceeds to block 710. At block 710, the collision type 2 counter is incremented. Although the RACH request signals from different user terminals collided (e.g., superimposed, commingled, combined in one or both of frequency or time domains), one of the signals is sufficiently detectable or resolvable. The sufficiently detectable signal is passed to SAT LMAC 330 to continue initial network entry for that user terminal.

If the denoised power from CE is equal or above the threshold (no branch of block 704), then process 700 proceeds to block 712. Block 712 performs an error check similar to block 706. If the error check fails (yes branch of block 712), then process 700 proceeds to block 714. At block 714, the collision type 1 counter is incremented. Although the RACH request signals from different user terminals collided (e.g., superimposed, commingled, combined in one or both of frequency or time domains), both signals can be sufficiently separately detected or resolved. Each of the separately detectable signals is passed to SAT LMAC 330 to continue initial network entry for respective user terminals.

If the error check passes (no branch of block 712), then process 700 proceeds to block 716. If the denoised power from CE is greater than a high threshold (a threshold value higher than the threshold for block 704) (yes branch of block 716), then process 700 proceeds to block 720. At block 720, the collision type 3 counter is incremented. Collision type 3 counter is associated with the RACH Request signals colliding and being additive together. Accordingly, the individual signals cannot be separated and no signals are passed to SAT LMAC 330. The user terminals associated with these signals will restart initial network entry.

If the denoised power from CE is less than the high threshold (no branch of block 716), then process 700 proceeds to block 718. At block 718, the single counter is incremented. Single counter is associated with satellite 102 receiving a single INE RACH request in that radio frame. The single RACH request is passed to SAT LMAC 330.

Figure 8:
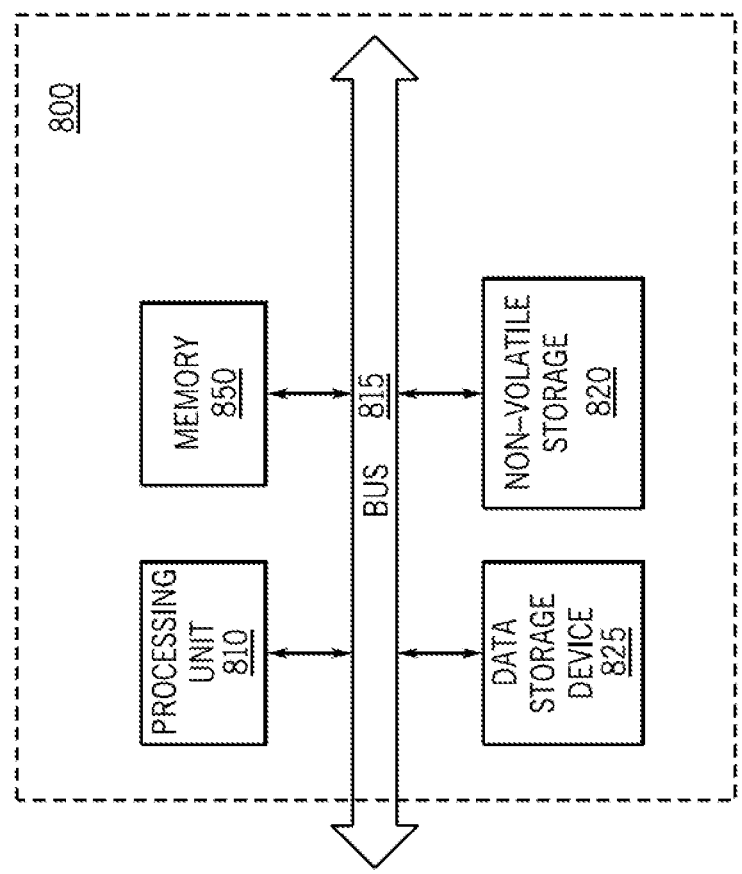
FIG. 8 illustrates a block diagram showing an example platform or device that can be implemented in the user terminal and/or satellite in accordance with various aspects of the present disclosure.

FIG. 8 illustrates a block diagram showing an example platform or device that can be implemented in the user terminal 110 and/or satellite 102 in accordance with various aspects of the present disclosure. Platform 800 comprises at least a portion of any of components 302-316 and 324-336. Platform 800 as illustrated includes bus or other internal communication means 815 for communicating information, and processor 810 coupled to bus 815 for processing information. The platform further comprises random access memory (RAM) or other volatile storage device 850 (alternatively referred to herein as main memory), coupled to bus 815 for storing information and instructions to be executed by processor 810. Main memory 850 also may be used for storing temporary variables or other intermediate information during execution of instructions by processor 810. Platform 800 also comprises read only memory (ROM), static storage, or non-volatile storage device 820 coupled to bus 815 for storing static information and instructions for processor 810, and data storage device 825 such as a magnetic disk, optical disk and its corresponding disk drive, or a portable storage device (e.g., a universal serial bus (USB) flash drive, a Secure Digital (SD) card). Data storage device 825 is coupled to bus 815 for storing information and instructions.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit (ASIC) or otherwise.

A tangible machine-readable storage medium includes any mechanism that provides (e.g., stores) information in a non-transitory form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

What is claimed is:

1. A user terminal comprising:
   a communication module (CM) configured to generate an initial network entry request;
   an antenna assembly configured to find, in response to the initial network entry request, a satellite based on a search of a sky, wherein the search of the sky comprises sequentially changing a beam pointing direction of the antenna assembly, wherein the satellite is assigned to downlink to a geographic cell associated with the user terminal; and
   a media access control (MAC) layer component configured to generate an uplink radio frame including a random access channel (RACH) request associated with the initial network entry request at a particular portion of the uplink radio frame for the satellite, wherein the CM is configured to generate the initial network entry request via a connection manager component, wherein the user terminal uses a same temporary service identifier for the initial network entry request as a second user terminal that initiates another network entry request at approximately a same time as the initial network entry request, wherein the user terminal selects a temporary service identifier independent of other user terminals and the satellite, and wherein the user terminal resends a request to initiate network entry.

2. The user terminal of claim 1, wherein the uplink radio frame comprises a plurality of RACH resources allocated by an uplink (UL)-map received from the satellite, and wherein the plurality of RACH resources are located at an end of the uplink radio frame in a time domain.

3. The user terminal of claim 2, wherein each RACH resource of the plurality of RACH resources comprises contiguous resource blocks within the uplink radio frame.

4. The user terminal of claim 2, wherein the uplink radio frame comprises a plurality of orthogonal frequency division multiplexing (OFDM) symbols, and wherein more than one RACH resources of the plurality of RACH resources is included in an OFDM symbol of the plurality of OFDM symbols.

5. The user terminal of claim 1, wherein the RACH request includes a temporary service identifier selected by the user terminal.

6. The user terminal of claim 5, wherein the RACH request includes an identification blob associated with the temporary service identifier to be used for contention resolution.

7. The user terminal of claim 5, wherein the MAC layer component is configured to receive a new service identifier of the user terminal from the satellite after authorization into a network, and wherein the new service identifier replaces the temporary service identifier and the new service identifier comprises a unique identifier of the user terminal within the network.

8. The user terminal of claim 1, wherein the RACH request is included in a MAC protocol data unit (PDU) and the MAC PDU is encoded using modulation and coding scheme (MCS) 0.

9. The user terminal of claim 1, wherein the antenna assembly is configured in a receive mode to find the satellite.

10. A method comprising:
generating an initial network entry request;
in response to the initial network entry request, finding, via an antenna assembly of a user terminal, a satellite based on a search of a sky, wherein the search of the sky comprises sequentially changing a beam pointing direction of the antenna assembly, wherein the satellite is assigned to downlink to a geographic cell associated with the user terminal; and
generate, via a MAC layer component, an uplink radio frame including a RACH request associated with the initial network entry request at a particular portion of the uplink radio frame for the satellite, wherein the user terminal uses a same temporary service identifier for the initial network entry request as a second user terminal that initiates another network entry request at approximately a same time as the initial network entry request, wherein the user terminal selects a temporary service identifier independent of other user terminals and the satellite, and wherein the user terminal resends a request to initiate network entry.

11. The method of claim 10, wherein the uplink radio frame comprises a plurality of RACH resources allocated by an UL map received from the satellite, and wherein the plurality of RACH resources are located at an end of the uplink radio frame in a time domain.

12. The method of claim 11, wherein each RACH resource of the plurality of RACH resources comprises contiguous resource blocks within the uplink radio frame.

13. The method of claim 11, wherein the uplink radio frame comprises a plurality of OFDM symbols, and wherein more than one RACH resources of the plurality of RACH resources is included in an OFDM symbol of the plurality of OFDM symbols.

14. The method of claim 10, wherein the RACH request includes a temporary service identifier of the user terminal selected by the MAC layer component.

15. The method of claim 14, wherein the RACH request includes an identification blob associated with the temporary service identifier to be used for contention resolution.

16. The method of claim 14, further comprising receiving a new service identifier of the user terminal from the satellite after authorization into a network, wherein the new service identifier replaces the temporary service identifier and the new service identifier comprises a unique identifier of the user terminal within the network.

17. The method of claim 10, wherein the RACH request is included in a MAC PDU and the MAC PDU is encoded using MCS 0.

18. The method of claim 10, wherein the antenna assembly is configured in a receive mode to find the satellite.

* * * * *